United States Patent
Shand et al.

(10) Patent No.: US 7,630,298 B2
(45) Date of Patent: Dec. 8, 2009

(54) METHOD AND APPARATUS FOR FORWARDING DATA IN A DATA COMMUNICATIONS NETWORK

(75) Inventors: Ian Michael Charles Shand, Cobham (GB); Stewart Frederick Bryant, Redhill (GB); Anna Charny, Sudbury, MA (US); Bruce Stuart Davie, Cambridge, MA (US); George Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 434 days.

(21) Appl. No.: 10/976,076

(22) Filed: Oct. 27, 2004

(65) Prior Publication Data

US 2006/0087965 A1    Apr. 27, 2006

(51) Int. Cl.
*H04J 1/16* (2006.01)
*H04L 12/28* (2006.01)
(52) U.S. Cl. ...................... 370/218; 370/392
(58) Field of Classification Search ............... None
See application file for complete search history.

(56) References Cited

U.S. PATENT DOCUMENTS

| | | | |
|---|---|---|---|
| 4,956,835 A | 9/1990 | Grover | |
| 5,243,592 A | 9/1993 | Perlman et al. | |
| 5,253,248 A | 10/1993 | Dravida et al. | |
| 5,825,772 A | 10/1998 | Dobbins et al. | |
| 5,959,968 A | 9/1999 | Chin et al. | |
| 5,999,286 A | 12/1999 | Venkatesan | |
| 6,002,674 A | 12/1999 | Takei et al. | |
| 6,032,194 A | 2/2000 | Gai et al. | |
| 6,044,075 A | 3/2000 | Le Boudec et al. | |
| 6,061,650 A | 5/2000 | Malkin et al. | |
| 6,075,631 A | 6/2000 | Bala et al. | |
| 6,098,107 A | 8/2000 | Narvaez-Guarnieri et al. | |
| 6,111,257 A | 8/2000 | Shand et al. | |
| 6,128,750 A | 10/2000 | Espy et al. | |
| 6,148,410 A | 11/2000 | Baskey et al. | |

(Continued)

FOREIGN PATENT DOCUMENTS

CN    1440159 A    9/2003

(Continued)

OTHER PUBLICATIONS

Wikipedia, "List of IPv4 Protocol Numbers," located on the internet at http://en.wikipedia.org/wiki/IP_protocol, retrieved on Feb. 1, 2007, 7 pages.

(Continued)

*Primary Examiner*—Andrew Lee
(74) *Attorney, Agent, or Firm*—Hickman Palermo Truong & Becker LLP

(57) ABSTRACT

A method of forwarding data in a data communications network having a plurality of nodes comprises the steps, performed at a repairing node, of computing the repair path around a network component to a target node and forwarding data along the repair path. The computing step comprises the step of computing an intermediate node reachable by the repairing node and from which the target node can be reached. The forwarding step includes the step of constructing a Multi-Protocol Label Switching (MPLS) packet for forwarding to the intermediate node.

43 Claims, 14 Drawing Sheets

U.S. PATENT DOCUMENTS

| | | | |
|---|---|---|---|
| 6,185,598 B1 | 2/2001 | Farber et al. | |
| 6,243,754 B1 | 6/2001 | Guerin et al. | |
| 6,246,669 B1 | 6/2001 | Chevalier et al. | |
| 6,256,295 B1 | 7/2001 | Callon | |
| 6,295,275 B1 | 9/2001 | Croslin | |
| 6,321,271 B1 | 11/2001 | Kodialam et al. | |
| 6,343,122 B1 | 1/2002 | Andersson | |
| 6,349,091 B1 | 2/2002 | Li | |
| 6,356,546 B1 | 3/2002 | Beshai | |
| 6,389,764 B1 | 5/2002 | Stubler et al. | |
| 6,473,421 B1* | 10/2002 | Tappan | 370/351 |
| 6,507,577 B1* | 1/2003 | Mauger et al. | 370/356 |
| 6,535,481 B1 | 3/2003 | Andersson et al. | |
| 6,578,086 B1 | 6/2003 | Regan et al. | |
| 6,654,361 B1 | 11/2003 | Dommety et al. | |
| 6,668,282 B1 | 12/2003 | Booth et al. | |
| 6,690,671 B1 | 2/2004 | Anbiah et al. | |
| 6,697,325 B1 | 2/2004 | Cain | |
| 6,704,320 B1 | 3/2004 | Narvaez et al. | |
| 6,711,125 B1 | 3/2004 | Walrand et al. | |
| 6,714,551 B1 | 3/2004 | Le-Ngoc | |
| 6,718,382 B1 | 4/2004 | Li et al. | |
| 6,778,531 B1 | 8/2004 | Kodialam et al. | |
| 6,829,215 B2 | 12/2004 | Tornar | |
| 6,879,594 B1 | 4/2005 | Lee et al. | |
| 6,895,441 B1* | 5/2005 | Shabtay et al. | 709/238 |
| 6,928,484 B1 | 8/2005 | Huai et al. | |
| 6,944,131 B2 | 9/2005 | Beshai et al. | |
| 6,950,870 B2 | 9/2005 | Beaulieu | |
| 6,982,951 B2 | 1/2006 | Doverspike et al. | |
| 6,996,065 B2 | 2/2006 | Kodialam et al. | |
| 7,046,680 B1 | 5/2006 | McDysan et al. | |
| 7,058,016 B1 | 6/2006 | Harper | |
| 7,099,286 B1 | 8/2006 | Swallow | |
| 7,113,481 B2 | 9/2006 | Elie-Dit-Cosaque et al. | |
| 7,158,486 B2 | 1/2007 | Rhodes | |
| 7,209,434 B2* | 4/2007 | Kano et al. | 370/216 |
| 7,242,664 B2 | 7/2007 | Einstein et al. | |
| 7,260,645 B2 | 8/2007 | Bays | |
| 7,274,654 B2 | 9/2007 | Yang et al. | |
| 7,274,658 B2 | 9/2007 | Bornstein et al. | |
| 7,280,472 B2 | 10/2007 | Rigby et al. | |
| 7,292,581 B2 | 11/2007 | Finn | |
| 7,330,440 B1 | 2/2008 | Bryant et al. | |
| 7,349,427 B1 | 3/2008 | Canning et al. | |
| 7,490,165 B1 | 2/2009 | Katukam et al. | |
| 2002/0004843 A1 | 1/2002 | Andersson et al. | |
| 2002/0021671 A1 | 2/2002 | Quinlan | |
| 2002/0037010 A1 | 3/2002 | Yamauchi | |
| 2002/0069292 A1 | 6/2002 | Gaddis et al. | |
| 2002/0093954 A1 | 7/2002 | Weil et al. | |
| 2002/0112072 A1 | 8/2002 | Jain | |
| 2002/0116669 A1 | 8/2002 | Jain | |
| 2002/0131362 A1 | 9/2002 | Callon | |
| 2002/0136223 A1 | 9/2002 | Ho | |
| 2002/0171886 A1* | 11/2002 | Wu et al. | 359/110 |
| 2002/0172157 A1 | 11/2002 | Rhodes | |
| 2003/0063613 A1 | 4/2003 | Carpini et al. | |
| 2003/0079040 A1 | 4/2003 | Jain et al. | |
| 2003/0103449 A1* | 6/2003 | Barsheshet et al. | 370/222 |
| 2003/0110287 A1* | 6/2003 | Mattson | 709/238 |
| 2003/0193959 A1 | 10/2003 | Lui et al. | |
| 2003/0210705 A1 | 11/2003 | Seddigh et al. | |
| 2003/0223361 A1 | 12/2003 | Hussain et al. | |
| 2004/0001497 A1 | 1/2004 | Sharma | |
| 2004/0001508 A1 | 1/2004 | Zheng et al. | |
| 2004/0017796 A1 | 1/2004 | Lemieux et al. | |
| 2004/0038671 A1 | 2/2004 | Trayford et al. | |
| 2004/0071089 A1* | 4/2004 | Bauer et al. | 370/238 |
| 2004/0085894 A1 | 5/2004 | Wang et al. | |
| 2004/0117251 A1 | 6/2004 | Shand | |
| 2004/0151181 A1 | 8/2004 | Chu et al. | |
| 2004/0185777 A1 | 9/2004 | Bryson | |
| 2005/0007950 A1 | 1/2005 | Liu | |
| 2005/0031339 A1 | 2/2005 | Qiao et al. | |
| 2005/0038909 A1 | 2/2005 | Yoshiba et al. | |
| 2005/0047353 A1 | 3/2005 | Hares | |
| 2005/0088965 A1* | 4/2005 | Atlas et al. | 370/216 |
| 2005/0097219 A1* | 5/2005 | Goguen et al. | 709/238 |
| 2005/0111351 A1* | 5/2005 | Shen | 370/217 |
| 2005/0281271 A1 | 12/2005 | Beshai et al. | |
| 2006/0007929 A1 | 1/2006 | Desai et al. | |
| 2006/0013125 A1 | 1/2006 | Vasseur et al. | |
| 2006/0018253 A1 | 1/2006 | Windisch et al. | |
| 2006/0080421 A1* | 4/2006 | Hu | 709/223 |
| 2006/0182117 A1* | 8/2006 | Chen et al. | 370/395.5 |
| 2006/0221962 A1 | 10/2006 | Previdi et al. | |
| 2006/0291391 A1 | 12/2006 | Vasseur et al. | |
| 2007/0011284 A1 | 1/2007 | Le Roux et al. | |
| 2007/0038767 A1 | 2/2007 | Miles et al. | |
| 2007/0248016 A1 | 10/2007 | Ashwood Smith et al. | |
| 2007/0291790 A1 | 12/2007 | Ue et al. | |

FOREIGN PATENT DOCUMENTS

| | | |
|---|---|---|
| WO | WO 02/06918 | 1/2002 |
| WO | 0223832 A2 | 3/2002 |

OTHER PUBLICATIONS

Wikipedia, "Ping," located in the internet at <http://wikipedia.org/wiki/Ping>, retrieved on Feb. 1, 2007, 3 pages.

Notification of Transmittal of the International Search Report and the Written Opinion of the International Searching Authority, or the Declaration as received in corresponding International application No. PCT/US06/06238.

Pending claims in PCT/US06/06238.

Wang, Zheng et al., "Shortest Path First with Emergency Exits," ACM 089791-405-8/90/0009/0166, 1990, pp. 166-176.

International Searching Authority, International Search Report, PCT/US04/33827, dated Mar. 28, 2005, 8 pages.

Current Claims, PCT/US04/33827, 6 pages.

International Searching Authority, "Notification of Transmittal of the International Search Report and the Written Opinion of the International Searching Authority, or the Declaration", international application No. pct/us06/28083, Received Nov. 30, 2007, 11 pages.

Claims, international application No. pct/us06/28083, 3 pages.

AU Examiner's First Report for foreign patent application No. 2004311004 dated Jun. 23, 2008 (1 pg).

AU Examiner's Second Report for foreign patent application No. 2004311004 dated Aug. 18, 2008 (1 pg).

Current claims for AU foreign patent application No. 2004311004 (6 pgs).

Office Action from CN for foreign application No. 200480033007.8 dated Apr. 11, 2008 (10 pgs) with English translation (11 pgs).

Current claims for CN foreign patent application No. 200480033007.8 (6 pgs).

Canadian Intellectual Property Office. Requisition. Method and Apparatus For Advertising a Link Cost In a Data Communications Network. Application No. 2509359. Mar. 26, 2008. pp. 1-3.

* cited by examiner

METHOD AND APPARATUS FOR FORWARDING DATA IN A DATA COMMUNICATIONS NETWORK

FIELD OF THE INVENTION

The present invention generally relates to forwarding data. The invention relates more specifically to a method and apparatus for forwarding data in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (usually routers directing the packet along one or more of a plurality of links connected to it) according to one of various routing protocols.

One such protocol is MPLS (Multi Protocol Label Switching). MPLS is a protocol that is well known to the skilled reader and which is described in document "Multi Protocol Label Switching Architecture" which is available at the time of writing on the file "rfc3031.txt" in the directory "rfc" of the domain "ietf.org" on the World Wide Web. According to MPLS, a complete path for a source-destination pair is established, and values required for forwarding a packet between adjacent routers in the path together with headers or "labels" are pre-pended to the packet. The labels are used to direct the packet to the correct interface and next hop. The labels precede the IP or other header allowing smaller outer headers.

The path for the source-destination pair, termed a Label Switched Path (LSP) can be established according to various different approaches. One such approach is Label Distribution Protocol (LDP) in which each router in the path sends its label to the next hop router on the path as determined from its IP routing table. Alternatively Resource Reservation Protocol (RSVP) can be invoked in which case, for example, a network administrator can engineer a path, providing strict source routing.

For each LSP created, a forwarding equivalent class (FEC) is associated with the path specifying which packets are mapped to it.

A problem in data communication networks arises upon de-activation of a network component such as a link or a node either by component failure or by planned down time. In either case there is a period of disruption to the delivery of traffic and packets for destinations which were previously reached by traversing the deactivated component may be dropped. In many time-critical applications it is not sufficient for the routers to converge on the adjusted network in a normal way as this takes too much time. Accordingly one known solution in MPLS networks is to pre-compute and pre-signal a repair path using RSVP methods. Such an approach can, however, require network administrator configuration of the repair paths.

An alternative approach is described in "ip/ldp local protection" which is available at the time of writing on the file "draft-atlas-ip-local-protect-00.txt" in the directory "pub/id" of the domain "watersprings.org" on the World Wide Web. According to the approach described in this document, a computing node computes both a "primary next-hop" for packets for a destination together with an "alternate next-hop". The alternate next hop is used in the case of failure of the primary next hop (failure either of the next-hop node or the link to the next hop-node). The alternate next-hop can be another neighbor node whose own shortest path to the destination does not include the computing node. In another case the alternate next-hop is a "U-turn alternate" comprising a neighbor whose primary next hop is the computing node. And which has as its alternate next-hop a node whose shortest path does not include the computing node. However this approach can only redirect a packet over a maximum of two hops.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for forwarding data in a data communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Forwarding Data in a Data Communications Network 4.0 Implementation Mechanisms—Hardware Overview
5.0 Extensions and Alternatives

\* \* \*

1.0 General Overview

The needs identified in the foregoing Background, and other needs and objects that will become apparent for the following description, are achieved in the present invention, which comprises, in one aspect, a method of forwarding data in a data communications network having a plurality of nodes. The method comprises the steps, performed at the repairing node of computing a repair path around a network component to a target node and forwarding data along the repair path. The computing step comprises the step of computing an intermediate node reachable by the repairing node and from which the target node can be reached. The forwarding step includes the step of constructing a Multi-Protocol Label Switching (MPLS) packet for forwarding to the intermediate node.

In other aspects, the invention encompasses a computer apparatus and a computer-readable medium configured to carry out the foregoing steps.

2.0 Structural and Functional Overview

Figure 1:
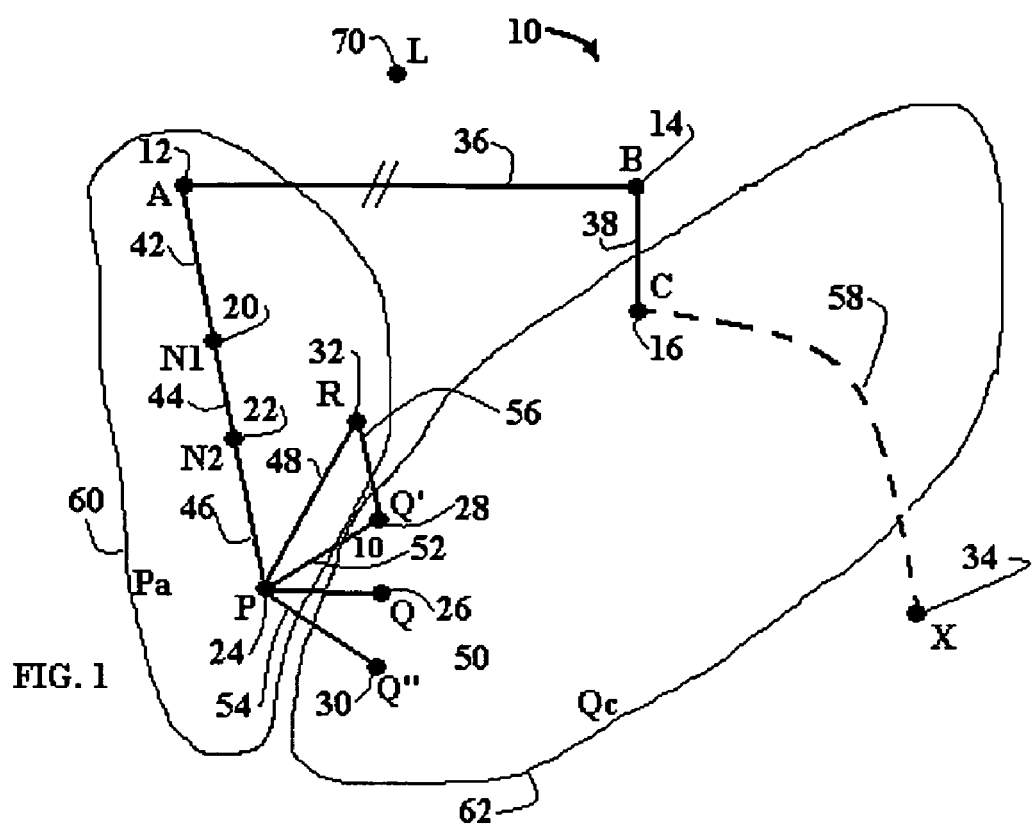
FIG. 1 is a representation of a network illustrating a method of forwarding data.

In overview a method for forwarding data can be understood with reference to FIG. 1 which depicts an illustrative network diagram to which the method is applied. The network is designated generally 10 and includes nodes A to C reference numerals 12, 14, 16, nodes $N_1$, $N_2$, reference numerals 20, 22, node P, reference numeral 24, nodes Q, Q', Q", reference numerals 26, 28, 30, node R, reference numeral 32 and node X, reference numeral 34. Node B is connected to nodes A and C via respective links 36 and 38. Node A is connected to node P via nodes $N_1$ $_{and N2}$ joined by successive links 42, 44 and 46. Node P is connected to nodes R, Q, Q' and Q" via respective links 48, 50, 52 and 54 and node R is joined to node Q' via link 56. All of the links have a cost 1 excepting link 52 joining nodes P and Q' which has a cost of 10.

In the case of normal routing node A will forward packets to node X via node B, node C and a path designated generally 58. However referring to FIG. 1 link 36 between nodes A and B has failed. As a result node A must construct a repair path to node C from which the packet can be forwarded, without packets traversing link 36 (and in the case of failure of node B, that node as well).

According to the method described herein the repair path is constructed according to the approach described in co-pending patent application Ser. No. 10/340,371, filed 9 Jan. 2003, entitled "Method and Apparatus for Constructing a Backup Route in a Data Communications Network" of Kevin Miles et al., ("Miles et al."), the entire contents of which are incorporated by reference for all purposes as if fully set forth herein and discussed in more detail below. According to the solution put forward in Miles et al, a repairing node (node A) pre-computes a first set of nodes comprising the set of all nodes reachable according to its protocol other than nodes reachable by traversing an adjacent component. This is termed here node A's "P-space" $P_a$ reference numeral 60 and the operation is carried out for each adjacent component. The repairing node also pre-computes a second set of nodes comprising the set of all nodes from which a target node (node C) is reachable without traversing the failed component. This is termed here node C's "Q-space", $Q_C$, reference numeral 62. The method then determines whether any intermediate nodes exist in the intersection between the first and second sets of nodes $P_a$, $Q_C$ or a one-hop extension thereof. When the repairing node detects failure of an adjacent component it tunnels packets for the target node C to a tunnel end point comprising a node in the intersection of the first and second sets of nodes calculated for that failed component.

In particular FIG. 1 shows a network in which $P_a$ and $Q_C$ are one-hop apart in which case "directed forwarding" is implemented between P-space and Q-space, that is, the packet is source routed from node P, the tunnel end-point, to a node in Q-space termed here the "release point". It is possible that multiple nodes in Q-space are within one hop of node P in P-space as represented by node Q, Q' and Q" in the embodiment shown. It will be noted that in the case that node P forwards packets to node Q' then directed forwarding ensures that the packet is sent over link 52 (the higher cost route) rather than via node R and links 48 and 56 (the lower cost route).

As a result of this approach an optimized and rapidly implemented repair route technique can be introduced in an MPLS network. Furthermore, making use of MPLS forwarding allows enhanced tunneling capability and in particular the possibility of multiply nested tunnels. Furthermore because the MPLS encapsulations are significantly smaller than IP tunnel headers and do not require a check sum fix-up higher performance is available.

In the MPLS implementation, in the case where the intermediate node lies both in P-space and Q-space and directed forwarding is not required then node A simply computes the repair path to node P and constructs a label switched path to node P in a manner described in more detail below. Where, however, directed forwarding is required the packet from node A to node P must carry a directed forwarding instruction for node P and various manners in which this can be achieved is described in more detail below. In addition, node A also needs to discover the node in Q-space's label for forwarding the packet to the destination and once again various approaches to achieving this are discussed in more detail below.

The method described herein further extends to additional improvements to repair paths in particular implemented in MPLS networks.

3.0 Method of Forwarding Data in a Data Communications Network

Figure 2:
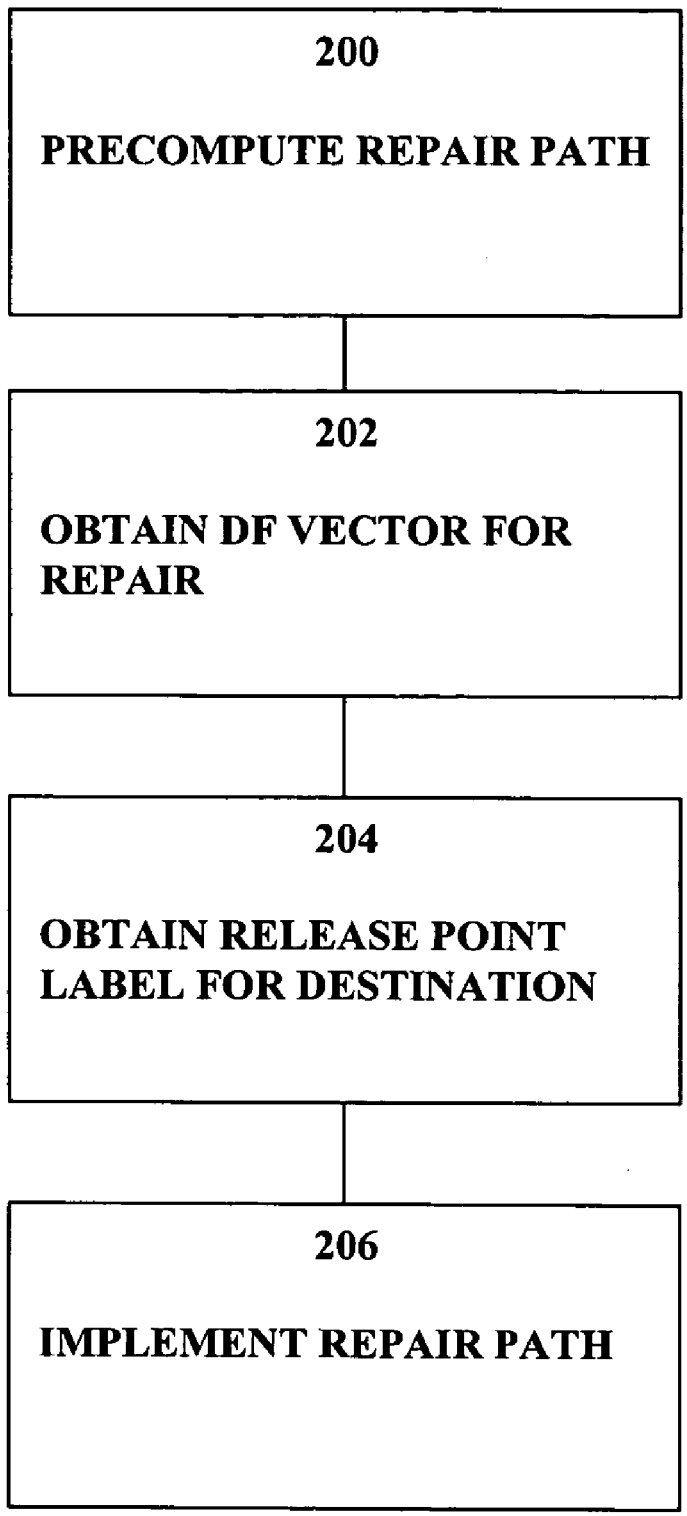
FIG. 2 is a flow diagram illustrating a method for forwarding data.

Referring to FIG. 2, which is a flow diagram illustrating in more detail a method of forwarding data, the steps taken by a repairing node such as node A in FIG. 1 are shown in more detail. In block 200 the repairing node pre-computes its repair paths. In block 202 node A obtains the directed forwarding label for directed forwarding from node P to node Q termed here the "DF Vector". In block 204 node A further obtains the label issued by node Q for forwarding to the eventual destination. In block 206, upon failure of a neighboring node, node A implements its repair path strategy. Each of the steps will now be described in more detail.

The manner in which a repairing node such as node A pre-computes its repair path is described in detail in Miles et al and is only summarized here for purposes of ease of reference. In order to compute its P-space node A computes a shortest path tree rooted at node A but excising nodes reachable via the failed network component, node B. Similarly to compute the Q-space of a target node comprising a neighbor of the failed component, node C, the reverse spanning tree diagram is computed for the target node again excising nodes reachable only via the failed component. If a common node is found in P-space this becomes the intermediate node to which repaired packets are tunneled from node A. Otherwise the tunneled packet to node P is then directly forwarded to a node in Q-space no more than one hop away. From node Q the packet will be forwarded normally to node X. In order to implement a fast re-route capability the repair paths are pre-computed at each participating node for each possible failure and each packet destination such that upon component failure the repair path can be implemented as soon as possible.

Because MPLS rather than conventional hop-by-hop IP forwarding is implemented to effectively tunnel the packets along the repair path, however, additional information is required at the repairing node in order to allow implementation of the repair path. As mentioned above, the first information required is the DF Vector such that node P will direct forward the packet to node Q as part of the repair strategy. Generally it is necessary to encode the DF operations within the framework of the MPLS network and establish how the DF Vectors or labels are distributed. In particular two ways of encoding a DF operation in an MPLS network are available, either in a form of a composite FEC or a label stack. In either case the label will then be assigned to repaired packets as appropriate but must first be available at the repairing node.

Figure 3:
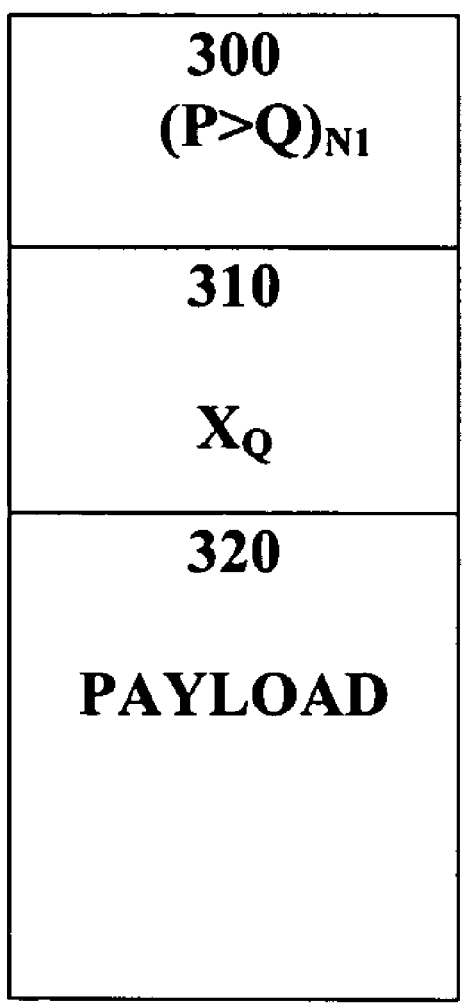
FIG. 3 is a representation of an MPLS packet constructed at a repairing node.

In the case of a composite FEC, a new composite FEC is created for packets to be repaired along the repair path with the semantics "forward to node P and then forward directly (i.e. direct forward) to node Q". For example where the eventual destination of a packet in the FEC is node X then the encapsulation at node A is as shown in FIG. 3. The outer header 300 comprises the composite FEC denoted $(P \rightarrow Q)_{N1}$. In other words node A has received from node $N_1$, $N_1$'s label carrying the instruction "forward to node P and then forward directly to node Q". The next nested header 310 is Q's label for forwarding to destination node X denoted $X_Q$. Nested within this header is the payload 320. Accordingly, as the packet is forwarded along the repair path, each node swaps the outer label on the packet such that the packet arrives at the next hop along the repair path with the appropriate label to convey the desired forwarding semantics (i.e. "forward to node P and then forward directly to node Q"). At node P the packet is forwarded to node Q which strips the outer label and forwards the packet according to its label $X_Q$.

Figure 4:
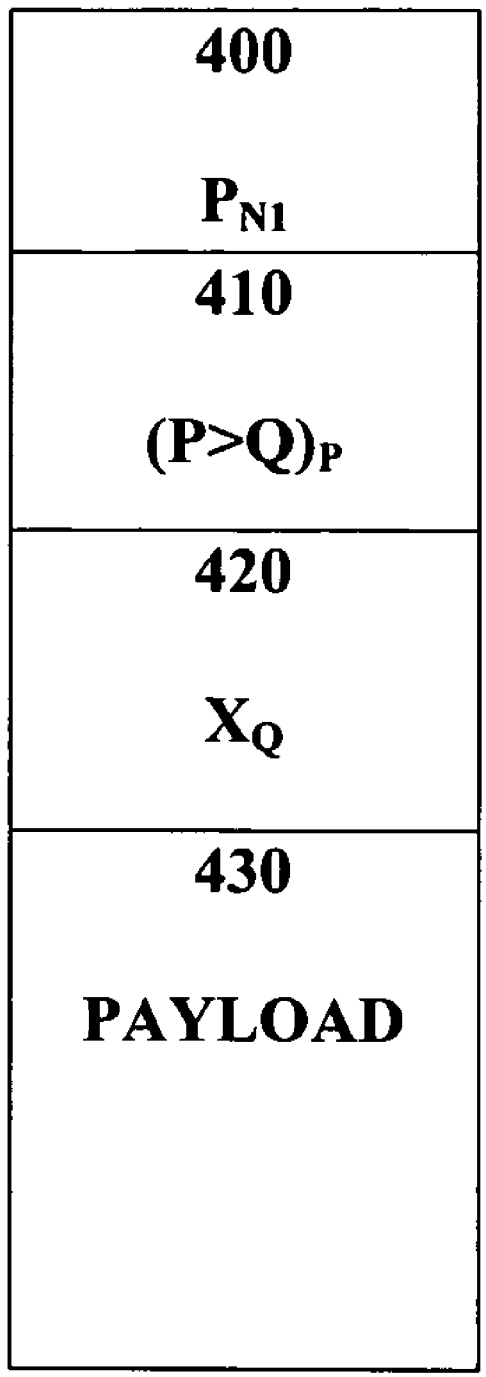
FIG. 4 is a representation of an alternative MPLS packet constructed at a repairing node.

In the alternative the label stack pushed on the packet by node A is as shown in FIG. 4 which is a block diagram of a packet forwarded by node A. The outer label 400 comprises node $N_1$'s label for P, $P_{N1}$. Nested label 410 comprises node P's label for directed forwarding from node P to node Q, $(P \rightarrow Q)_P$. Nested label 420 comprises node Q's label for X, $X_Q$. Finally the packet payload 430 for node X is attached. As a result in this case the packet is first forwarded to node P along the repair path, the outer label being swapped at each node. When the packet arrives at node P it strips the outer label and implements the directed forwarding instruction $(P \rightarrow Q)_P$. Node Q then forwards it according to its label $X_Q$ and so forth. In either case it will be appreciated that the approach further extends to a Penultimate Hop Popping (PHP) environment in which the penultimate router (node P) removes the MPLS label 300, 410 from the packet and forwards the inner packet to node Q which can thus process the packet with a single lookup.

Whether the directed forwarding instruction is carried in a single composite label as shown in FIG. 3 or a pair of stacked labels as shown in FIG. 4, a new FEC must be created with the appropriate forwarding semantics such that all packets assigned to the FEC are forwarded along the repair path and direct forwarded to Q. As a result when node P receives the packet with a label from this FEC it will direct forward the packets to node Q via the predetermined direct forwarding path rather than via the next hop calculated by normal forwarding. Various ways of distributing the FEC of either type will now be discussed in more detail.

In the first implementation the label of either type can be distributed by LDP in the conventional hop by hop methods. For example in the case of composite labels a router will generate its own composite label for each participating node in the network and provide this to each of its neighbors. Internally it maps each of these composite labels to a next hop and to the composite label to the destination node provided by the next hop in accordance with conventional LDP operation although of course with a more complex FEC. For example referring to the network shown schematically in FIG. 1, node P will distribute to each of its neighbors including node $N_2$ its DF vector for each of its neighbors $(P \rightarrow Q)_P$, $(P \rightarrow Q')_P$, $(P \rightarrow Q'')_P$ and so forth as well as its normal next hop vectors for each. Node $N_2$ in turn will distribute its label $(P \rightarrow Q)_{N2}$ to node $N_1$ which distributes its label $(P \rightarrow Q)_{N1}$ to node A. Accordingly when A implements the repair path for the corresponding FEC for example to node Q it pushes the label $(P \rightarrow Q)_{N1}$ as shown in FIG. 3 which is swapped at node $N_1$ for $(P \rightarrow Q)_{N2}$ and so forth according to conventional MPLS forwarding until the packet reaches node P. At node P the outer label is stripped and then the packet is direct forwarded to node Q.

In the case of the two label stack the DF FEC $(P \rightarrow Q)_P$ is propagated unchanged throughout the network via LDP. That is, the DF FEC $(P \rightarrow Q)_P$ is distributed to the immediate neighbors of P by conventional LDP means. In contrast to conventional LDP, this same FEC is re-distributed to the neighbors of the neighbors of P without modification, and so on until it is distributed throughout the network and thus it is learned by node A.

In an alternative implementation each node can flood via a consistent protocol such as IGP (Interior Gateway Protocol) a DF vector for each of its neighbors across the network in the form of an MPLS label from the DF FEC. As a result all routers in the network will receive all the DF vectors as part of the flooding of the IP topology information rather than via LDP. In that case, node A having established that it wishes to tunnel to node P and then direct forward to node Q as part of its repair strategy can retrieve the DF vector $(P \rightarrow Q)_P$ from its link-state database.

Figure 5:
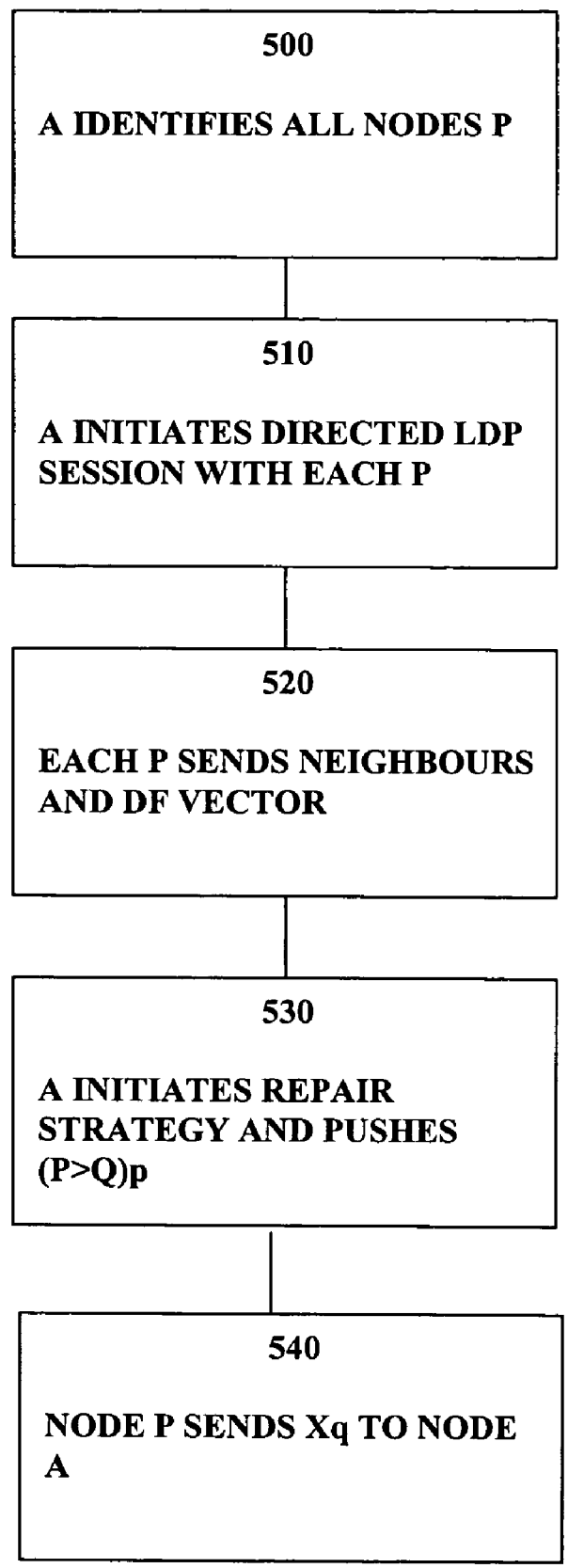
FIG. 5 is a flow diagram illustrating implementation of a repair strategy in MPLS.

A further implementation is described with reference to FIG. 5 which is a flow diagram illustrating a directed LDP session. In block 500 node A pre-computes its repair paths and identifies all of its node P routers, i.e. all nodes to which it could tunnel as part of a repair strategy. In block 510 node A initiates a directed LDP session with each node P. In block 520 each node P sends to node A, a list of its neighbors together with the MPLS label that P needs to direct forward to each neighbor i.e. $(P \rightarrow Q)_P$, $(P \rightarrow Q')_P$ and so forth. Accordingly when node A implements its repair strategy then for a destination requiring tunneling to node P and direct forwarding to node Q, it selects the appropriate label for the required node P and directed forwarding to the required node Q from its database and forwards the packet accordingly.

Figure 6:
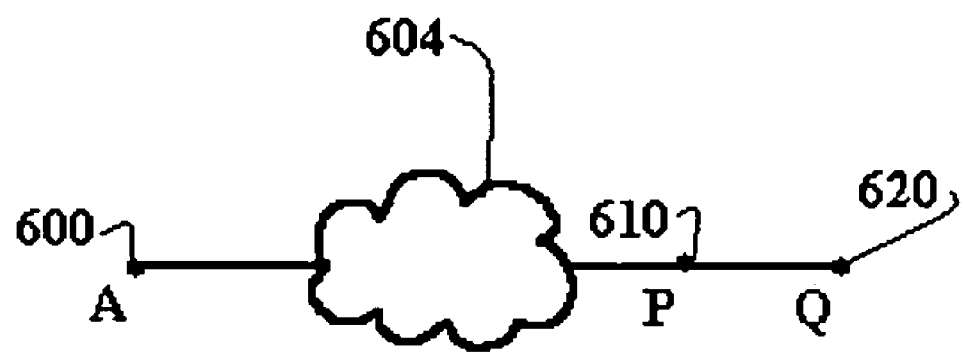
FIG. 6 is a representation of a network implementing a pseudo-wire connection.

Yet a further implementation can be understood with reference to FIG. 6 which depicts an illustrative network diagram to which the method is applied. In particular node A designated here 600 sets up a "pseudo wire" 604, that is, a dedicated tunnel from node A to node Q reference numeral 620. Pseudo wires of this type are described in the document "Requirements for Pseudo-Wire Emulation Edge-to-Edge" which is available at the time of writing on the file "draft-ietf-pwe3-arch-07.text" in the directory "internet-drafts" of the domain "ietf.org" on the World Wide Web the entire contents of which are incorporated by reference for all purposes as if fully set forth herein. In particular node P, reference numeral 610, will act as one provider edge and node Q as the customer edge, node A acting as the other provider edge on the pseudo-wire.

Reverting to FIGS. 3 and 4 it will be recalled that in addition to ensuring that node A has the directed forwarding vector P→Q, node A also needs the label of node Q for the final destination denoted here $X_Q$. This is because node Q has to know how to forward the packet.

Once again various implementations are possible. In the first implementation, if the packet is an IP packet then node A can simply omit the label. In that case once P has stripped off the respective labels all that remains will be the payload in the form of an IP packet which Q can forward using normal IP forwarding over MPLS. However this will not be appropriate in the case where there is also non-IP traffic.

In an alternative implementation, in an approach equivalent to that described with reference to FIG. 5 above, node A can initiate a directed LDP session with each of the available nodes Q identified according to its repair strategy. LDP is a protocol that is well known to the skilled reader and which is described in document "LDP Specification" which is available at the time of writing on the file "rfc3036.txt" in the directory "rfc" of the domain "ietf.org" on the World Wide Web. In that case node Q sends to node A the labels that it would have sent to node P according to normal LDP. As a result A obtains the label $X_Q$ and is able to formulate a packet of the type shown in FIG. 3 or FIG. 4. A variant of this approach can be understood with reference to FIG. 5 in which in an additional step during the directed LDP session between node A and node P, in block 540, node P sends to node A the labels it has received from its neighbor node, node Q which will include $X_Q$.

Figure 7:
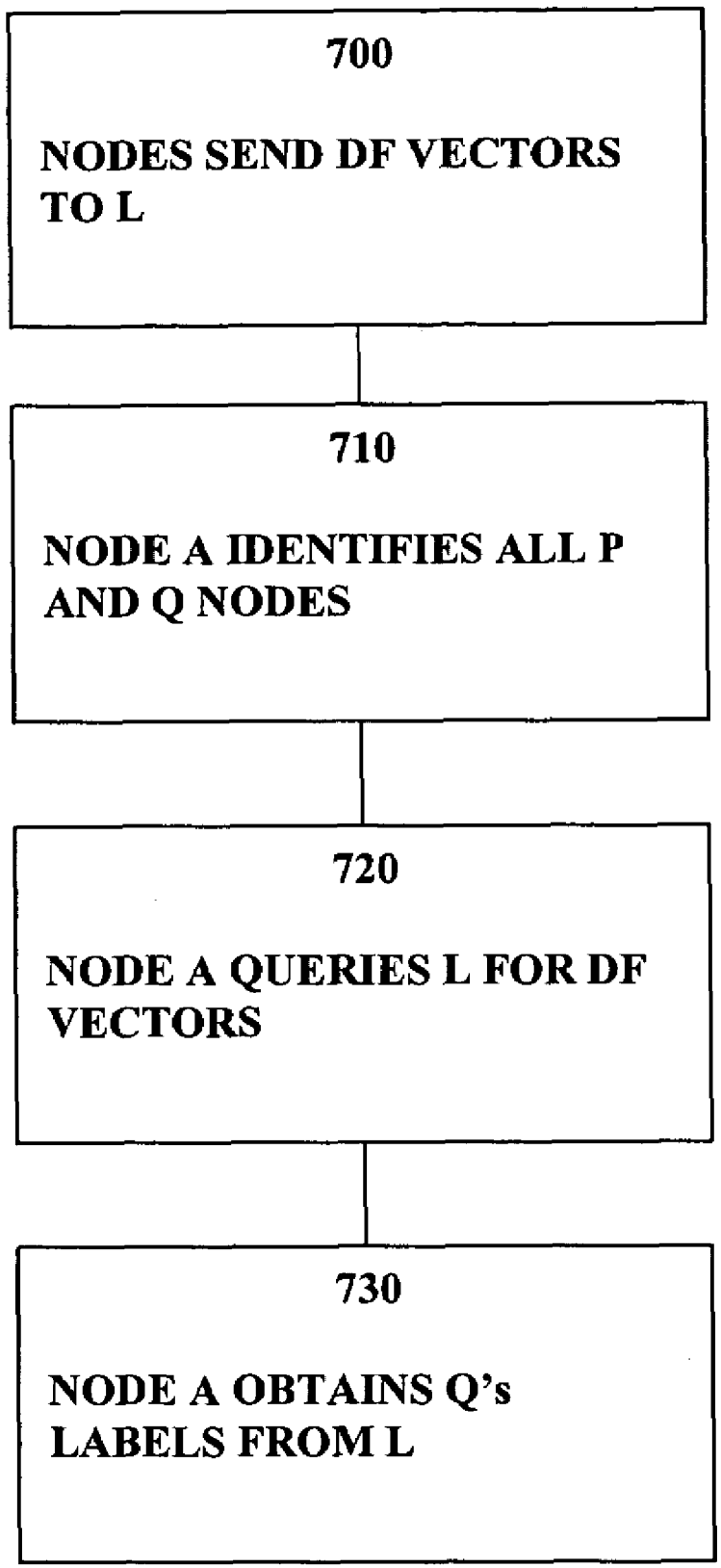
FIG. 7 is a flow diagram illustrating operation of a label server.

In addition to the various implementations described above for obtaining the labels (P→Q) and $X_Q$, additional functionality can be added into the MPLS network to allow the relevant labels to be extracted. In a first implementation an additional label server L, reference numeral 70 is included in the network shown in FIG. 1. Referring to FIG. 7 which is a flow diagram illustrating operation of the method in this approach, in block 700 each node in the network registers its DF labels with the label server L. In block 710 the repairing node, node A, computes its repair path and identifies all the P and Q nodes that it needs to use. In block 720, node A queries the label server to find the label that each node P needs to forward to each node Q. This can be in the form of a PQ query, i.e. identifying both the specific node P and the specific node Q required for the repair path, or can be a query for all of node P's DF vectors to adjacent nodes. In either case the DF label can be a composite label or a label to be nested in a two label stack.

In order to obtain Q's label for X, $X_Q$, in block 730 node A obtains Q's label database from the label server as well.

Each node can register or request a full database of labels or individual labels in order to minimize the size of the transaction required as a result of a topology change such that when a network update is flooded through IGP each node will know to query the label server for appropriate label data.

An additional or alternative functionality which can be incorporated into an MPLS network is the provision of "domain-wide labels". Typically, MPLS labels have only local scope, with the meaning of a given label being defined by the node that advertised it. This allows a single label to be used to mean many different things in different places in the network, and thus reduces the total size of the required label space. Accordingly a router imposing the label has to perform an association with the router that is going to interpret the label in order to learn the appropriate label value. MPLS further requires that a protocol is needed in order to exchange the labels with the neighbor nodes.

According to the domain-wide label approach a label is assigned a common meaning throughout a routing domain such as an IGP domain and the labels are flooded throughout the IGP. As a result all routers know the identity of the destination of a packet carrying a domain-wide label. Accordingly there is no need for an exchange of label information between nodes A and P and A and Q. A domain-wide label can be assigned for, for example, a packet tunneled to node P or a packet to be direct forwarded for node Q. Node Q can then strip the outer domain-wide label and forward the packet to the domain-wide label for destination X. Domain-wide labels can be allocated in any appropriate manner such as manual allocation or as a function of the IP address of a destination and can be a single stack entry or a composite of multiple label stack entries. As an alternative to flooding the domain-wide labels can be maintained, and accessed from a label server in a manner analogous to that described with reference to FIG. 7 above.

In this case the number of domain-wide labels is reduced by defining "normal" domain-wide addresses and "adjacency" domain-wide labels. A node receiving a domain-wide label will establish whether it is a normal forwarding domain-wide label or an adjacency domain-wide label. If it is an adjacency domain-wide label the receiving node will then establish whether it is for a neighbor node. In that case the receiving node forwards the packet to the neighbor node by directed forwarding. Otherwise the receiving node forwards the packet by normal forwarding towards the destination. As a result, for a network of N nodes only 2N domain-wide labels are required: a normal forwarding domain-wide label and an adjacency domain-wide label for each node.

Figure 8:
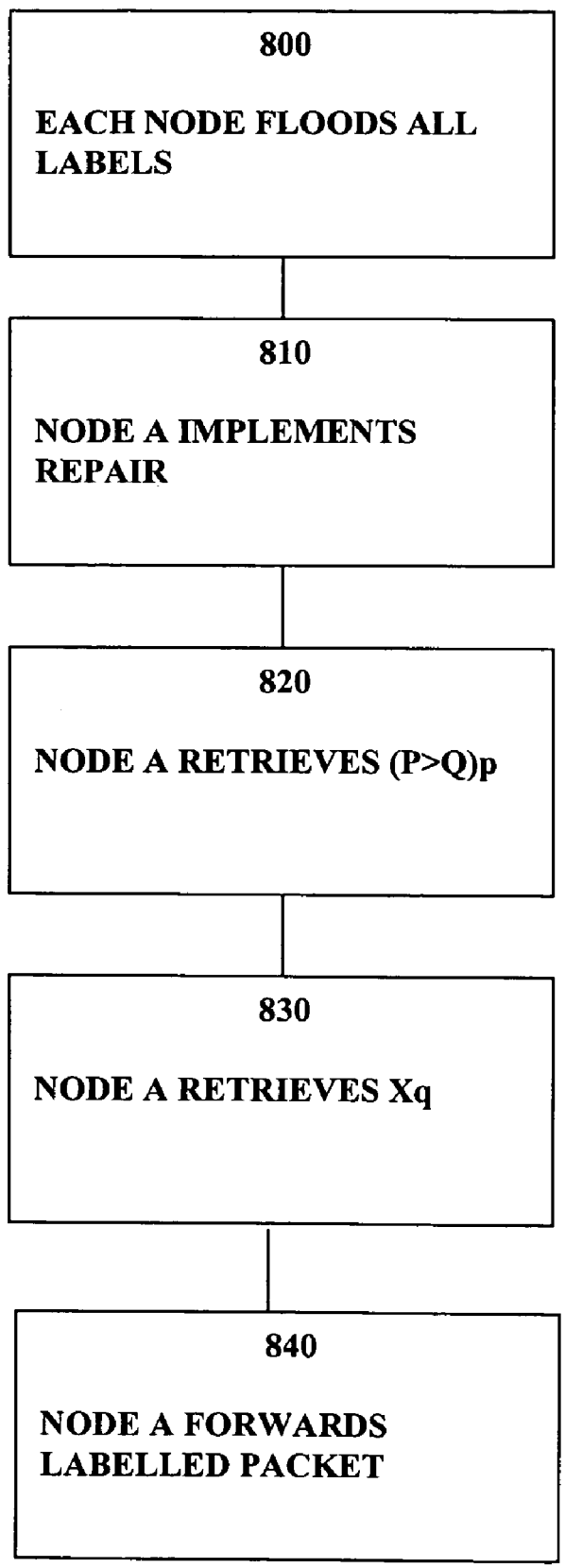
FIG. 8 is a flow diagram illustrating implementation of flooded local labels.

According to an alternative additional functionality the labels can be flooded according to a flooded local label (FLL) protocol. In this case local labels i.e. labels with local context rather than domain-wide context are used as in conventional MPLS but are flooded to all the nodes throughout the network using, for example, a link-state IGP rather than via LDP or RSVP. The method according to this implementation can be better understood with reference to FIG. 8 which is a flow diagram illustrating implementation of flooded local labels. In step 800 each node floods all of its labels throughout the network using IGP. As a result every node is able to determine the label that any other node would use to send an IP packet to any of its neighbors. In addition each node forwards not only its normal forwarding label but also its directed forwarding label for each adjacency. As a result a total of N(N−1+K) labels are required where N is the number of nodes in the network and K is the average number of neighbors of a node. Accordingly in block 810 node A implements its repair strategy and in block 820 node A retrieves from its database node P's DF vector for node Q $(P→Q)_P$. In block 830 node A retrieves from its database node Q's label for the destination node X, $X_Q$. Then in block 840 node A pushes the relevant labels onto the packet and forwards the packet constructed, for example, according to FIG. 4 above, to its neighbor.

It will further be appreciated that the MPLS techniques described above can be extended yet further in conjunction with the construction of backup routes of the type described in Miles et al to yet further enhance the scope and flexibility of backup routes. For example the capability for multiply nested tunnels with reduced overhead provided by MPLS provides significant benefits.

Figure 9:
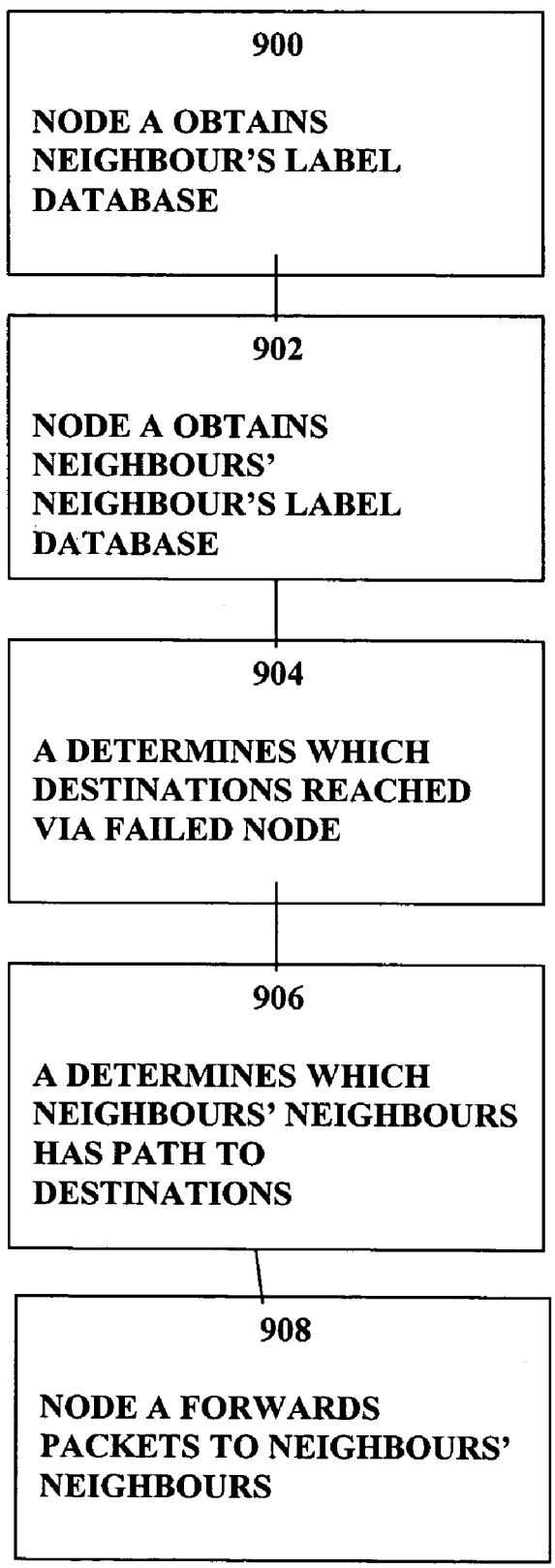
FIG. 9 is a flow diagram illustrating a two-hop label distribution protocol.
Figure 10:
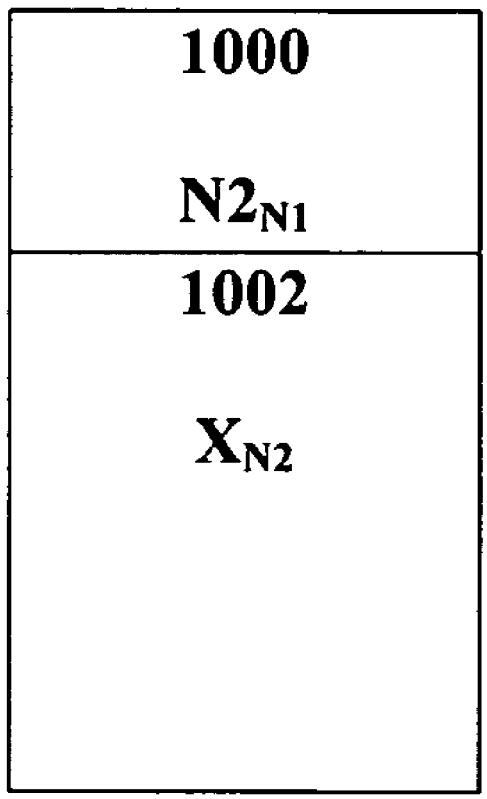
FIG. 10 is a representation of an MPLS packet constructed by a repair node implementing two-hop LDP.

A first extension of backup routes will be described with reference to FIG. 9 which is a flow diagram illustrating the method in detail implemented, for example on a network of the type shown in FIG. 1. In block 900 node A obtains the label database from each of its neighbors. In block 902 node A also obtains the label databases of each of its neighbors' neighbors for example by querying each of its neighbors or by any other label distribution approach discussed above. In block 904 node A determines which destinations are reachable via a failed component. In a pre-computing implementation A can carry this out for each potential adjacent failed component. In block 906 node A runs an SPF (shortest path first) algorithm on behalf of each of its neighbors' neighbors to establish whether any of those have a path to destinations which node A can only reach via the failed component and without themselves traversing the failed component. For example, referring to FIG. 1, node A may establish that node $N_2$ has a path not via failed node B to a destination node X where node A would normally reach node X via node B. Node A effectively sets up an FEC for packets destined for node X and for those packets constructs a label stack of the type shown in FIG. 10 including an outer header 1000 comprising $N_1$'s label for $N_2$ and an inner header 1002 comprising $N_2$'s label for X, $X_{N2}$.

Figure 11:
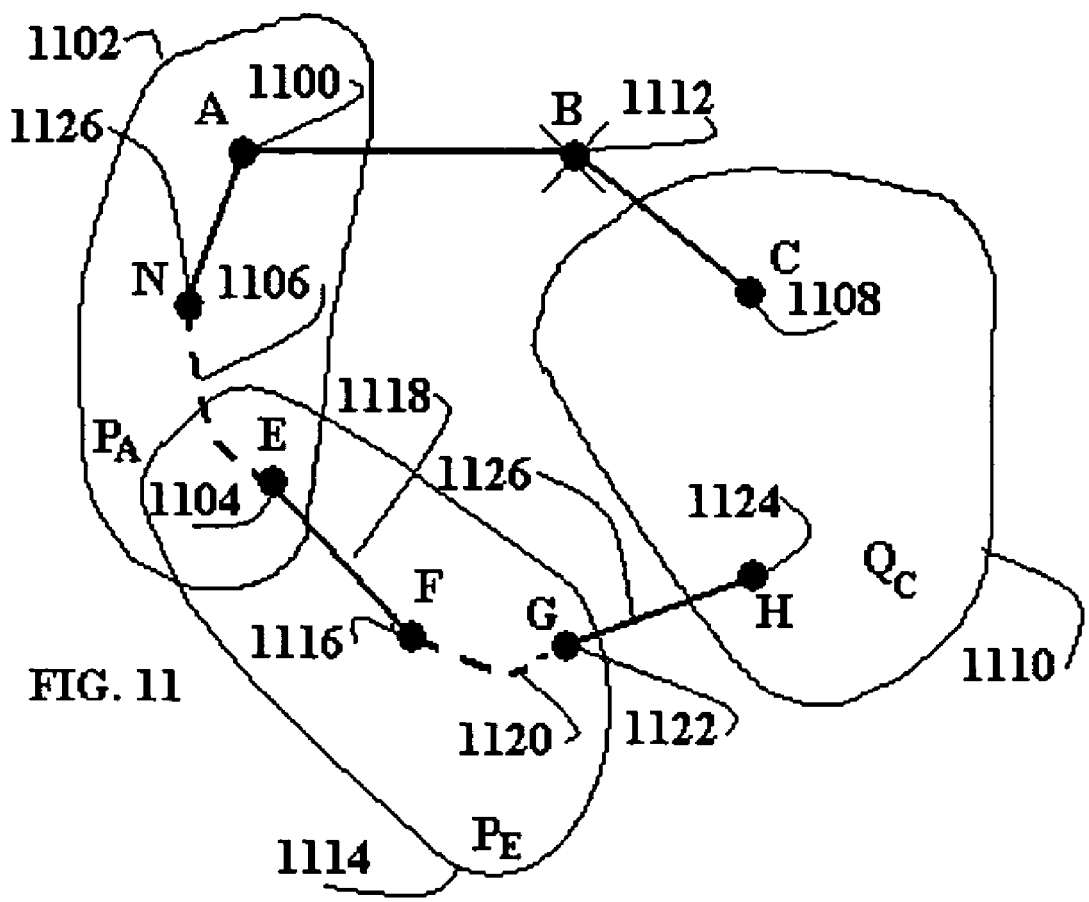
FIG. 11 is a representation of a network illustrating a double P-space expansion.

A further extension is described with reference to FIG. 11 which is a schematic network diagram illustrating double P-expansion. In the case of link failure in networks with symmetric costs it can be shown that there will always be an intersection or a one hop proximity between P and Q space with respect to the failed component B, reference numeral 1112. However in cases of asymmetric costs this proximity may not occur. Accordingly, as shown in FIG. 11 node A, reference numeral 1100 has a P-space 1102 $P_A$ with a node E 1104 at the edge. A path 1106 exists between a neighbor node of node A, node N, reference 1126, and node E. In the case that node E does not intersect with the Q-space 1110 $Q_C$ of a destination node, say node C, reference numeral 1108 then node A is able to explore the P-space of the or each node on the edge of A's P-space (for example node E), or nodes within one hop of the edge nodes (for example node F, reference 1116), to see if there is an intersection with the target Q-space, $Q_C$.

One manner of doing this is to use node E's "extended" P-space, that is to say the union of the P-spaces of each of E's neighbors. In the same manner A's P-space can in fact be A's extended P-space.

Accordingly the extended P-space 1114 of node E includes a node F 1116 one hop from node E via link 1118. Node F has a path 1120 to a node G 1122 on the edge of node E's extended P-space 1114. Node G is in turn one hop from a node H 1124 in node C's Q-space 1110 $Q_C$ via link 1126. Accordingly a repair path is constructed via nodes N, E, F, G and H. Alternatively node A's and/or node E's non-extended P-space can be used.

Figure 12:
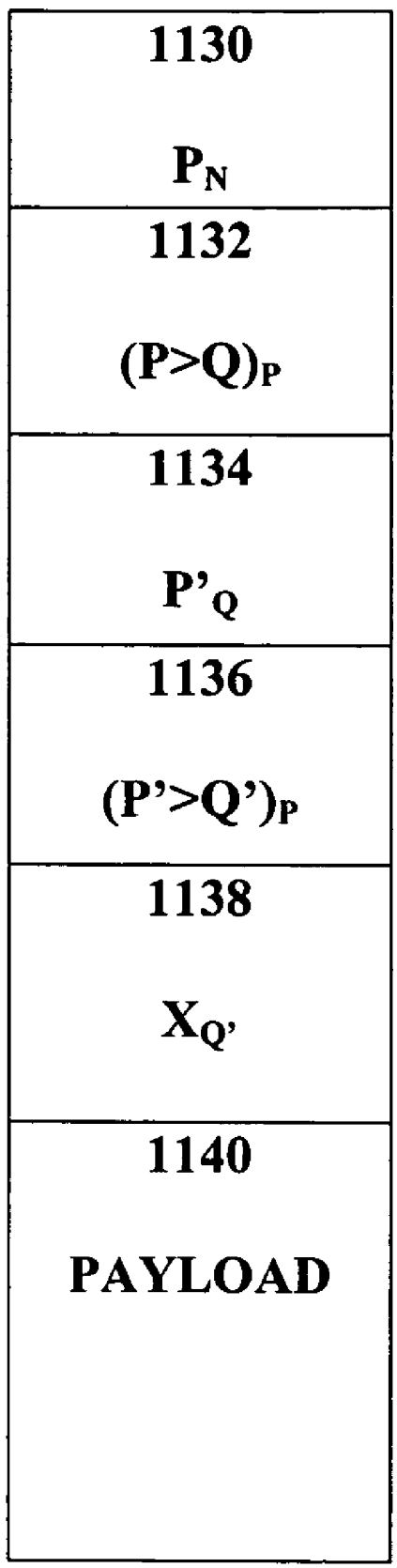
FIG. 12 is a representation of an MPLS packet constructed by a repairing node implementing double P-space expansion.

FIG. 12 is a schematic diagram showing a label stack constructed at node A for forwarding a packet via double P-space. Where A's next hop on the path to node P is node N, reference 1126 in FIG. 11, then the outer label 1130 is N's label for P, $P_N$. The next label 1132 is P's directed forwarding label for Q, $(P \rightarrow Q)_P$. The next label 1134 is Q's label for P', $P'_Q$. The next label 1136 is (P')'s directed forwarding label for Q' $(P' \rightarrow Q')_{P'}$, 1136 and the next label 1138 is (Q')'s label for destination X, $X_{Q'}$. The packet further comprises a payload 1140. Despite the multiple nesting of labels, the MPLS network supports this approach.

Figure 13:
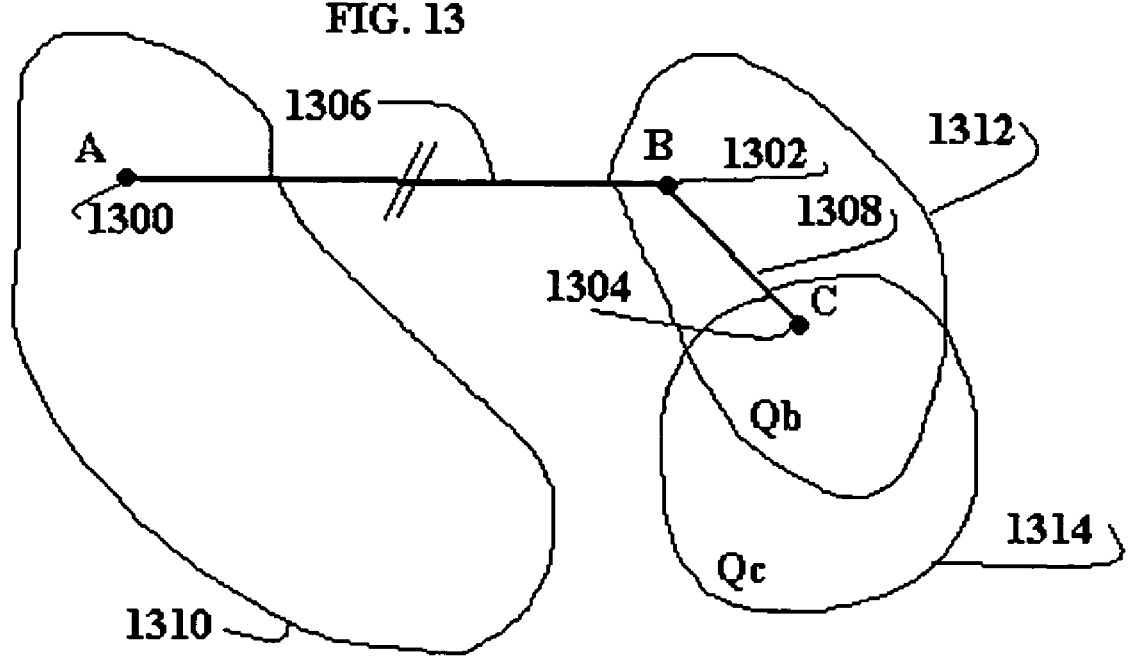
FIG. 13 is a representation of a network illustrating an extended Q-space.

A further development of repair path construction can be understood with reference to FIG. 13 which is a schematic network diagram illustrating an extended Q-space. A network includes node A, reference 1300, node B, reference 1302 and node C, reference 1304. Nodes A and B are joined by link 1306 and nodes B and C are joined by link 1308. Node A has a P-space 1310 in the case of failure of node B or link 1306. In the case of link failure of link 1306, the target of node A's repair path is node B and node B has a Q-space 1312, designated $Q_B$. As discussed above it is possible to introduce an extended P-space for node A comprising the union of the P-space's of each of A's neighbors with respect to the failed component, in this case link 1306. In addition node B can have an extended Q-space comprising the union of the Q-spaces of each of its neighbors, in this case the Q-space 1314 of node C designated $Q_C$. As a result even if an intersection of P and Q-space or a one-hop extension is not available, a repair path may be built using the neighbors of the target and their respective Q-spaces. In that case it will be noted that in addition to a label configuration of the type shown in FIG. 3 or FIG. 4, node A will also require the neighbor's label for the target, in this case $B_C$, for tunneling the repaired packet to node C.

Yet a further implementation comprises allowing extension of the number of hops between P and Q-space. Referring once again to FIG. 1 it will be seen that A's edge node P in P-space 60 is one hop from edge node Q in Q-space 62. However using MPLS it is possible to push sufficient MPLS labels to accommodate multiple hops between node P and node Q in the form effectively of strict or loose source routing between P and Q, once again benefiting from the advantages of multiply nested MPLS labels. In this case node A would calculate its P-space or extended P-space, and the Q-space or extended Q-space of a target node. A label-switched path could then be constructed between an edge node P and an edge node Q in the case in that they were not co-incident or adjacent using techniques of the type described above.

It will be recognized that any appropriate extensions or variations used in the construction of repair paths can be implemented on an MPLS network. As discussed above it is possible to extend P-space or Q-space to include the union of the P-spaces of the repairing node or the Q-spaces of the target node with respect to the failed component. In addition, as described in co-pending patent application Ser. No. 10/442,589, filed 20 May 2003, entitled "Method and Apparatus for Constructing a Transition Route in a Data Communications Network" of Stewart F. Bryant et al., (Bryant et al) the entire contents of which are incorporated by reference for all purposes as if fully set forth herein, the approach can be extended to cover repairs for non-adjacent nodes. Accordingly a node not adjacent to a failure can nonetheless calculate a repair path to a target using the approaches discussed above.

Yet further, as described in co-pending patent application Ser. No. 10/848,669, filed May 18, 2004, entitled "Method and Apparatus for Forwarding Data in a Data Communications Network" of Mike Shand et al ("Shand et al"), it is possible to construct a "secondary repair path". In that case a primary repairing node which is unable to establish a repair path to a target instead establishes a repair path to a secondary repairing node which can instigate a repair path for the target, for example by computing the P and Q-space for the secondary repairing node. As also discussed in Shand et al repair path can also be computed in the case of "multi-homed prefixes" (MHP). In some instances, rather than a prefix or address belonging for example to different autonomous systems or mission critical services being attached to exactly one node in the network, in many cases the same prefix will be attached for two or more nodes which may not be adjacent. According to the solution put forward in Shand et al, traffic for an MHP is tunneled to a node to which the MHP is attached other than the failed component.

In the case of secondary repairs and MHPs, an additional layer of encapsulation is constructed at node A allowing tunneling to be required to the destination either in the form of a secondary repairing node or an MHP alternative attachment point. As discussed above, node A will need to obtain the tunnel end point's label for the destination. For example when node A is conducting a secondary repair to a neighbor of a failed node it will need to acquire the necessary labels from the neighbor as well as node Q and place them in the label stack. The labels can be acquired in any of the manners discussed above as appropriate.

In the case of an MHP repair which may or may not involve secondary repair, node A needs to acquire the alternate exits points labeled to the destination according to one of the approaches described above and provide an appropriate encapsulation in the label stack. Alternatively since MHP is an IP concept node A could determine the path to the alternate exit point and allow the alternate exit points to perform a simple IP lookup for the final destination and forward as normal.

Once again it will be seen that these approaches can be implemented in, and improved by the techniques adopted by an MPLS network.

In order to implement the repair path, upon detection of a failed component the repairing node, node A in FIG. 1, will simply identify the FEC to which an incoming packet requiring repairing belongs and then forward the packet accordingly using the techniques described above.

The mechanisms by which the method and optimizations discussed above are implemented will be well known to the skilled reader and do not require detailed discussion here. For example the manner in which the repair paths are computed, the MPLS labels pushed and exchanged and packets forwarded along the repair path can be implemented in any appropriate manner such as hardware or software and using for example micro-code.

4.0 Implementation Mechanisms—Hardware Overview

Figure 14:
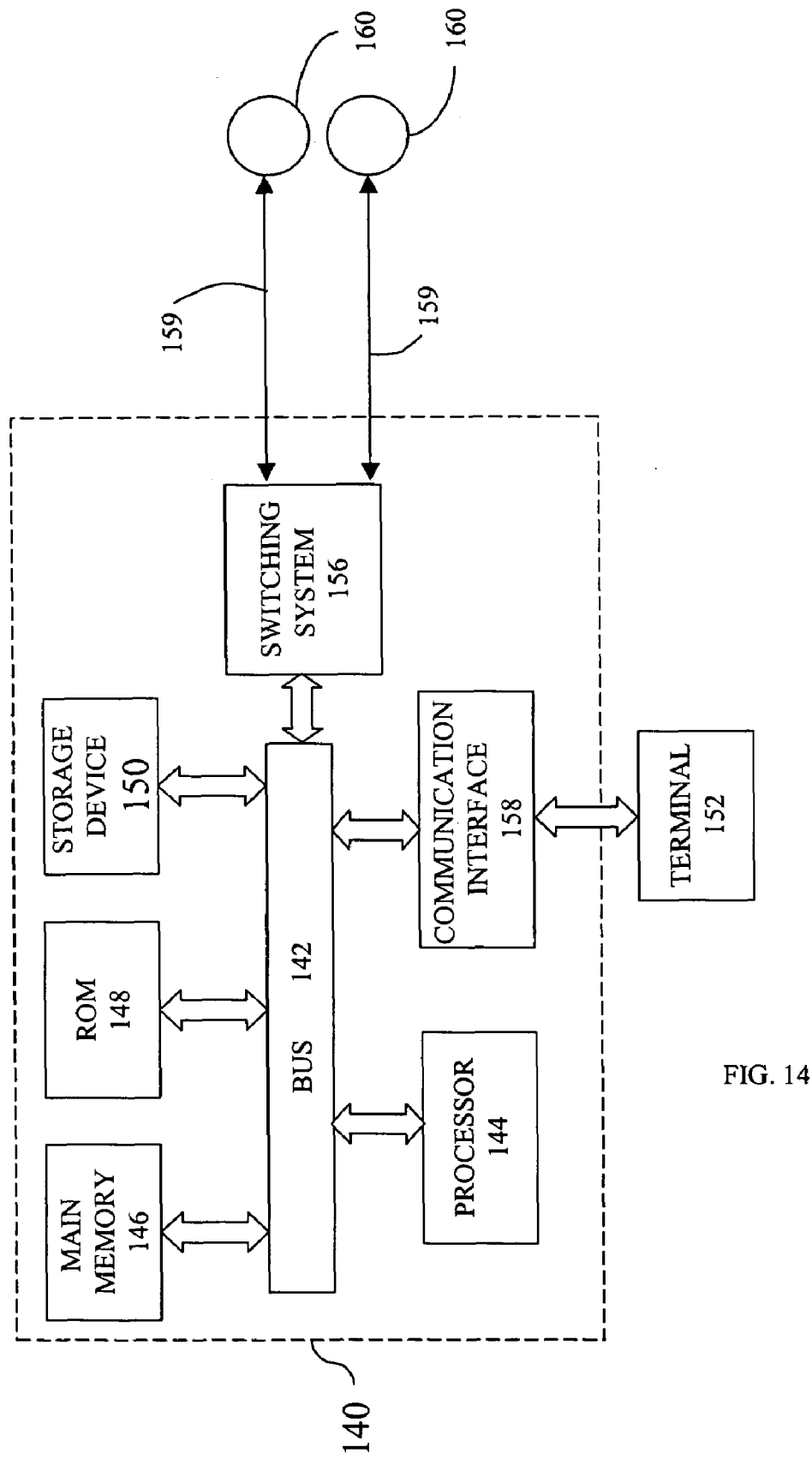
FIG. 14 is a block diagram that illustrates a computer system upon which a method for forwarding a tunneled packet may be implemented.

FIG. 14 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a repairing node or target node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate routing protocol and mechanism can be adopted to implement the invention. The method steps set out can be carried out in any appropriate order and aspects from the examples and embodiments described juxtaposed or interchanged as appropriate.

Any appropriate implementation of MPLS and any appropriate label distribution protocol can be adopted to implement the invention. Similarly, where required, any appropriate link state protocol such as intermediate system-intermediate system (IS-IS) or open shortest path first (OSPF) can be implemented. Link state protocols of this type are well understood by the skilled reader and well documented in pre-existing documentation, and therefore are not described in detail here. Similarly any appropriate network can provide the platform for implementation of the method.

Any appropriate repair path construction in which the repairing node identifies an appropriate intermediate node which it can reach and from which the target node is reachable can be introduced as well.

Although the discussion is principally directed to use of an IP based repair path construction strategy in an MPLS network it will be seen that use of the MPLS encapsulation and techniques described above in an IP network is also contemplated. One possible example is the case of directed forwarding where an MPLS label is used as the PQ vector for example.

What is claimed is:

1. A method of forwarding data in a data communications network having
   a plurality of nodes comprising the steps, performed at a repairing node of:
   computing a repair path around a network component to a target node; and
   forwarding data along the repair path,
   wherein the computing step comprises computing an intermediate node reachable by the repairing node and from which the target node can be reached, and
   wherein the forwarding step includes the step of constructing a multi-protocol label switching (MPLS) packet for forwarding to the intermediate node, and
   wherein constructing an MPLS packet includes
      constructing a normal forwarding instruction and a directed forwarding instruction to reach the intermediate node, and
      pushing a label of the intermediate node for the target node onto the packet.

2. A method as claimed in claim 1 in which the normal forwarding instruction and directed forwarding instruction comprise a composite instruction.

3. A method as claimed in claim 2 in which the composite instruction is received at the repairing node via a Label Distribution Protocol (LDP).

4. A method as claimed in claim 1 further comprising the steps of pushing, onto the data packet, a normal forwarding label comprising a normal forwarding instruction and a directed forwarding label comprising a directed forwarding instruction.

5. A method as claimed in claim 1 in which the normal forwarding instruction and directed forwarding instruction are received at the repairing node via a label distribution protocol (LDP).

6. A method as claimed in claim 1 further comprising the step, performed at the repairing node, of implementing a directed LDP session with the intermediate node to obtain the normal forwarding instruction and the directed forwarding instruction.

7. A method as claimed in claim 1 in which the repairing node receives the directed forwarding instruction during a flooding operation.

8. A method as claimed in claim 1 further comprising the step, performed at the repairing node, of implementing a pseudo wire to the intermediate node.

9. A method as claimed in claim 1 further comprising the step, performed at the repairing node, of querying a label server for the normal forwarding instruction and the directed forwarding instruction.

10. A method as claimed in claim 1 in which the normal forwarding instruction and the directed forwarding instruction comprise global labels.

11. A method as claimed in claim 1 in which the normal forwarding instruction and the directed forwarding instruction comprise MPLS labels that are received during a flooded local label operation.

12. A method as claimed in claim 1 further comprising the step, performed at the repairing node, of implementing a directed LDP session with the intermediate node and obtaining the intermediate node's label for the destination.

13. A method as claimed in claim 1 further comprising the step, performed at the repairing node, of implementing a directed LDP session with a neighbor of the intermediate node and obtaining the neighbor node's label for the destination.

14. A method as claimed in claim 1 in which the intermediate node's label for the destination is a global label.

15. A method as claimed in claim 1 further comprising the step, performed at the repairing node, of receiving the intermediate node's label for a destination during a flooded local label operation.

16. A method as claimed in claim 1 further comprising the step, performed at the repairing node, of querying a label server for the intermediate node's label for a destination.

17. A method of forwarding data in a data communications network comprising the steps, performed at a forwarding node, of receiving a request from a requesting node for a directed LDP session and forwarding to the requesting node an MPLS label, further comprising the forwarding node performing the step of forwarding all MPLS labels received from its neighboring nodes.

18. A method of forwarding data in a data communications network comprising the steps, performed at a forwarding node, of receiving a request from a requesting node for a directed LDP session and forwarding to the requesting node an MPLS label, in which the MPLS label comprises at least one of a normal forwarding instruction and a directed forwarding instruction.

19. A method as claimed in claim 18 in which the MPLS label is a specific label requested by the requesting node.

20. A method as claimed in claim 18 further comprising the forwarding node performing the step of forwarding all MPLS labels in its database.

21. A volatile or non-volatile computer readable medium comprising one or more sequences of instructions for forwarding data in a data communications network which, when executed by one or more processors, cause the one or more processors to perform,
at a repairing node:
computing a repair path around a network component to a target node; and
forwarding data along the repair path,
wherein the computing step comprises computing an intermediate node reachable by the repairing node and from which the target node can be reached, and
wherein the forwarding step includes the step of constructing a multi-protocol label switching (MPLS) packet for forwarding to the intermediate node, and
wherein constructing an MPLS packet includes
constructing a normal forwarding instruction and a directed forwarding instruction to reach the intermediate node, and
pushing a label of the intermediate node for the target node onto the packet.

22. The volatile or non-volatile computer readable medium as recited in claim 21, wherein the normal forwarding instruction and the directed forwarding instruction comprise a composite instruction.

23. The volatile or non-volatile computer readable medium of claim 21 further comprising one or more sequences of instructions for forwarding data in a data communications network which, when executed by one or more processors, cause the one or more processors to perform,
at the repairing node:
implementing a pseudo wire to the intermediate node.

24. The volatile or non-volatile computer readable medium of claim 21, further comprising one or more sequences of instructions for forwarding data in a data communications network which, when executed by one or more processors, cause the one or more processors to perform pushing, onto the data packet, a normal forwarding label comprising a normal forwarding instruction and a directed forwarding label comprising a directed forwarding instruction.

25. The volatile or non-volatile computer readable medium as recited in claim 21, in which the repairing node receives the directed forwarding instruction during a flooding operation.

26. The volatile or non-volatile computer readable medium as recited in claim 21, in which the normal forwarding instruction and the directed forwarding instruction comprise global labels.

27. The volatile or non-volatile computer readable medium as recited in claim 21, in which the normal forwarding instruction and the directed forwarding instruction comprise MPLS labels that are received during a flooded local label operation.

28. An apparatus for forwarding data in a data communications network having a plurality of nodes comprising:
means for computing a repair path around a network component to a target node; and
means for forwarding data along the repair path, in which the means for computing a repair path comprises means for computing an intermediate node reachable by the repairing node and from which the target node can be reached, in which the means for forwarding data comprises means for constructing a Multi-Protocol Label Switching (MPLS) packet for forwarding to the intermediate node, and in which the means for constructing an MPLS packet includes means for constructing a normal forwarding instruction and a directed forwarding instruction to reach the intermediate node and means for pushing a label of the intermediate node for the target node onto the packet.

29. The apparatus of claim 28, wherein the normal forwarding instruction and the directed forwarding instruction comprise a composite instruction.

30. The apparatus of claim 28, further comprising:
means for implementing a pseudo wire to the intermediate node.

31. The apparatus of claim 28, further comprising means for pushing, onto the data packet, a normal forwarding label comprising a normal forwarding instruction and a directed forwarding label comprising a directed forwarding instruction.

32. The apparatus of claim 28, in which the repairing node receives the directed forwarding instruction during a flooding operation.

33. The apparatus of claim 28, in which the normal forwarding instruction and the directed forwarding instruction comprise global labels.

34. The apparatus of claim 28, in which the normal forwarding instruction and the directed forwarding instruction comprise MPLS labels that are received during a flooded local label operation.

35. An apparatus for forwarding data in a data communications network, the apparatus comprising:

one or more processors; and a network interface communicatively coupled to the one or more processors and configured to communicate one or more packet flows among the one or more processors in a network and a computer readable medium comprising one or more sequences of instructions for forwarding data in a data communications network which when executed by the one or more processors, cause the one or more processors to perform, computing a repair path around a network component to a target node; and forwarding data along the repair path, wherein the computing comprises computing an intermediate node reachable by the repairing node and from which the target node can be reached, and wherein the forwarding includes constructing a multi-protocol label switching (MPLS) packet for forwarding to the intermediate node, and wherein constructing an MPLS packet includes constructing a normal forwarding instruction and a directed forwarding instruction to reach the intermediate node, and pushing a label of the intermediate node for the target node onto the packet.

36. The apparatus of claim 35, wherein the normal forwarding instruction and the directed forwarding instruction comprise a composite instruction.

37. The apparatus of claim 35, said computer readable medium further comprising one or more sequences of instructions for forwarding data in a data communications network which, when executed by one or more processors, cause the one or more processors to perform, at the repairing node:

implementing a pseudo wire to the intermediate node.

38. The apparatus of claim 35, said computer readable medium further comprising one or more sequences of instructions for forwarding data in a data communications network which, when executed by one or more processors, cause the one or more processors to perform pushing, onto the data packet, a normal forwarding label comprising a normal forwarding instruction and a directed forwarding label comprising a directed forwarding instruction.

39. The apparatus of claim 35, in which the repairing node receives the directed forwarding instruction during a flooding operation.

40. The apparatus of claim 35, in which the normal forwarding instruction and the directed forwarding instruction comprise global labels.

41. The apparatus claim 35, in which the normal forwarding instruction and the directed forwarding instruction comprise MPLS labels that are received during a flooded local label operation.

42. An apparatus for forwarding data in a data communications network, the apparatus comprising:

one or more processors; and a network interface communicatively coupled to the one or more processors and configured to communicate one or more packet flows among the one or more processors in a network and a computer readable medium comprising one or more sequences of instructions for forwarding data in a data communications network which when executed by the one or more processors, cause the one or more processors to perform, receiving a request from a requesting node for a directed LDP session and forwarding to the requesting node an MPLS label; and forwarding all MPLS labels received from its neighboring nodes.

43. An apparatus for forwarding data in a data communications network, the apparatus comprising:

one or more processors; and a network interface communicatively coupled to the one or more processors and configured to communicate one or more packet flows among the one or more processors in a network and a computer readable medium comprising one or more sequences of instructions for forwarding data in a data communications network which when executed by the one or more processors, cause the one or more processors to perform, receiving a request from a requesting node for a directed LDP session and forwarding to the requesting node an MPLS label; and wherein the MPLS label comprises at least one of a normal forwarding instruction and a directed forwarding instruction.

* * * * *

UNITED STATES PATENT AND TRADEMARK OFFICE
CERTIFICATE OF CORRECTION

PATENT NO.       : 7,630,298 B2
APPLICATION NO.  : 10/976076
DATED            : December 8, 2009
INVENTOR(S)      : Shand et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 607 days.

Signed and Sealed this

Twenty-first Day of December, 2010

David J. Kappos
*Director of the United States Patent and Trademark Office*